United States Patent [19]

Krutchen et al.

[11] Patent Number: 4,532,263
[45] Date of Patent: Jul. 30, 1985

[54] EXPANSIBLE POLYMER MOLDING PROCESS AND THE RESULTANT PRODUCT

[75] Inventors: Charles M. Krutchen, Pittsford; Wen-Pao Wu, Victor, both of N.Y.

[73] Assignee: Mobil Oil Corporation, New York, N.Y.

[21] Appl. No.: 560,643

[22] Filed: Dec. 12, 1983

[51] Int. Cl.$^3$ .................. B29D 27/00; C08G 18/14
[52] U.S. Cl. .................. 521/133; 264/53; 264/DIG. 5; 264/DIG. 9; 425/4 R; 521/131; 521/134; 521/139; 521/187; 521/189
[58] Field of Search .................. 264/53, 51, DIG. 9, 264/DIG. 5; 425/4 R; 521/133, 134, 131, 187, 189

[56] References Cited

U.S. PATENT DOCUMENTS 2,442,940  6/1948  Staudinger et al. .................. 264/53
2,787,809  4/1957  Stastny .................. 264/53
3,787,364  1/1974  Wirth et al.
4,024,110  5/1977  Takekoshi.
4,284,733  8/1981  Russo .................. 525/68

OTHER PUBLICATIONS

White, D. M., T. Takekoshi, F. J. Williams, A. R. Relles, P. E. Donahue, H. J. Klopfer, G. R. Loucks, J. S. Manello, R. O. Matthews, and R. W. Schluentz, "Polyetherimides Via Nitro-Displacement Polymerization: Monomer Synthesis and $^{13}$C-NMR Analysis of Monomers and Polymers", in *Journal of Polymer Science, Polymer Chemistry Edition,* vol. 19, No. 7, pp. 1635–1658.

Primary Examiner—Philip Anderson
Attorney, Agent, or Firm—Alexander J. McKillop; Michael G. Gilman; James P. O'Sullivan, Sr.

[57] ABSTRACT

A method for forming a molded polymer foam structure comprising expanding solvent imbibed polymer particles selected from the group consisting of a polyetherimide, a polycarbonate and a polyphenylene oxide-polystyrene blend and fusing the expanded particles together in a mold.

22 Claims, 3 Drawing Figures

EXPANSIBLE POLYMER MOLDING PROCESS AND THE RESULTANT PRODUCT

The present invention relates to a process for molding expansible polymers.

Polymers in foamed form have been employed in aircraft and other structures for insulation and structural purposes. The electrical industry also employs foamed polymers for electrical insulation. The electronics and appliance industry utilizes foamed polymers for electrical and thermal insulation and for structural purposes. It is essential that foams employed for these purposes be as resistant to heat and flame as possible. The art is ever on the alert for a foam which has excellent strength and also is highly fire resistant and which will give off only low levels of smoke or toxic fumes as it is heated to its degradation temperature.

One aspect of the present invention relates to a highly heat resistant novel foam structure prepared by a novel process.

SUMMARY OF THE INVENTION

The present invention relates to a process for forming a shaped foam structure comprising:

(a) imbibing particles of a member selected from the group consisting of a polyetherimide, a polycarbonate and a polymer blend of polyphenylene oxide and polystyrene with a solvent member selected from the group consisting of methylene chloride, chloroform, 1,1,2-trichloroethane and mixtures thereof, (b) heating the imbibed particles to a temperature sufficient to cause expansion of said particles to a density significantly less than that of the imbibed particles; and (c) filling a mold with the expanded particles and subjecting the particles to sufficient heat to fuse the particles together on cooling to form a shaped coherent foam structure.

DETAILED DESCRIPTION OF THE INVENTION

Figure 1:
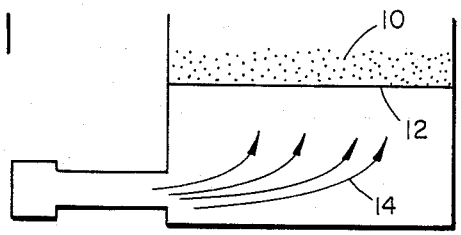
FIG. 1 is a side view of a schematic of a resin solvent imbibition system.

The polyetherimides of the type contemplated by the present invention have been known for some time but their preparation in foam form such that they have a density of less than about 20 lbs per cubic foot is believed to be novel. The contemplated polyetherimides are those which can be processed into expanded beads according to the present invention by means which comprise the use of a solvent member selected from the group consisting of methylene chloride, chloroform, 1,1,2-trichloroethane and mixtures thereof. U.S. Pat. Nos. 3,787,364 and 4,024,110, the disclosures of which are in their entirety incorporated herein by reference, disclose polyetherimides which can be formed into expanded beads according to the present process. Preferred among the polyetherimides disclosed in these patents are those having the following chemical structure:

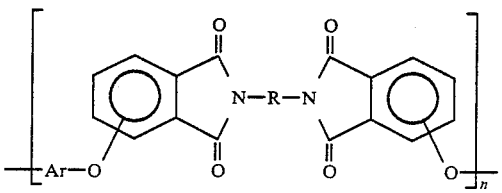

wherein Ar is a divalent organic radical containing from 6-20 carbon atoms, R is a bivalent radical selected from the group consisting of aliphatic, cycloaliphatic, aromatic and araliphatic, and n is an integer having a value greater than 1, for instance, 2, 3, 4 or greater. Particularly preferred are polymers wherein the precursor of Ar is Bisphenol A and R is a phenylene radical selected from the group consisting of the ortho, meta, para isomers or mixtures thereof. Polymers within the scope of this structure can be prepared by procedures outlined in the article by D. M. White et al entitled, "Polyetherimides Via Nitro-Displacement Polymerization. . . " etc, Journal of Polymer Science: Polymer Chemistry Edition, Vol. 19, pages 1635-1658 (1981), copyright 1981, John Wiley and Sons, Incorporated. Particular reference is made to the preparation of polymer "(18 ip)", having a molecular weight (Mw) of 21,000, on page 1653 thereof. The disclosure of this article is incorporated in its entirety herein by reference. Another specific example of the preparation of a polyetherimide within the contemplation of the present invention is as follows:

EXAMPLE 1

A mixture containing 2.855 parts of 1,3-bis(4-phenoxyphthalimido) benzene, 1.180 parts of Bisphenol A, 0.081 part of o-phenylphenol sodium salt and 20 parts of N-methylpyrrolidone is heated to reflux under nitrogen atmosphere. The heating is continued for one hour during which time an approximate total of 10 parts of liquid is distilled off. The reaction mixture is cooled and poured into about 300 parts of methanol which is stirred in a blender. A white polymer is precipitated. The polymer is filtered, washed and dried under vacuum. This polyetherimide can be formed into expanded particles according to the present invention.

A commercially available polyetherimide resin which corresponds to the above recited chemical formula, wherein Ar is derived from Bisphenol A and R is a phenylene radical, is Ultem ® avaialable from General Electric Company, Plastics Operations, ULTEM Products Section, One Plastics Avenue, Pittsfield, MA. This material has a $T_g$ of 421° F. It is available in particle form having a size roughly 1/16-⅛ inch in diameter by 1/16-3/16 inch in length. The following table details certain characteristics of the resin.

TABLE

| | ASTM TEST | UNITS | ULTEM 1000 |
| --- | --- | --- | --- |
| MECHANICAL | | | |
| Tensile strength, yield | D638 | psi | 15,200 |
| Tensile modulus, 1% secant | D638 | psi | 430,000 |
| Tensile elongation, yield | D638 | % | 7-8 |
| Tensile elongation, ultimate | D638 | % | 60 |
| Flexural strength | D790 | psi | 21,000 |
| Flexural modulus, | D790 | psi | 480,000 |

TABLE-continued

| | ASTM TEST | UNITS | ULTEM 1000 |
|---|---|---|---|
| tangent | | | |
| Compressive strength | D695 | psi | 20,300 |
| Compressive modulus | D695 | psi | 420,000 |
| Gardner impact | — | in-lb | 320 |
| Izod impact | D256 | | |
| notched (⅛") | | ft-lb/in | 1.0 |
| unnotched (¼") | | ft-lb/in | 25 |
| Shear strength, ultimate | — | psi | 15,000 |
| Rockwell hardness | D785 | — | M109 |
| Taber abrasion (CS 17, 1 kg) | D1044 | mg wt. loss/ 1000 cycles | 10 |
| THERMAL | | | |
| Deflection temperature, unannealed | D648 | | |
| @ 264 psi (¼") | | °F. | 392 |
| @ 66 psi (¼") | | °F. | 410 |
| Vicat softening point, method B | D1525 | °F. | 426 |
| Continuous service temperature index (UL Bulletin 746B) | — | °F. | 338 |
| Coefficient of thermal expansion (0 to 300° F.), mold direction | D696 | in/in-°F. | $3.1 \times 10^{-5}$ |
| Thermal conductivity | C177 | Btu-in/h-ft²-°F. | 1.5 |
| FLAMMABILITY | | | |
| Oxygen index (0.060") | D2863 | % | 47 |
| Vertical burn (UL Bulletin 94) | — | — | V-O @ 0.025" 5 V @ 0.075" |
| NBS smoke, flaming mode (0.060") | E662 | | |
| $D_5$ @ 4 min | | — | 0.7 |
| $D_{MAX}$ @ 20 min | | — | 30 |

The contemplated polycarbonates are those which, in particulate form, are capable of being imbibed with sufficient of the above-identified solvent members to ultimately yield molded pre-blown particles of a density less than about 20 lbs/ft³. The polycarbonates have the chemical structure:

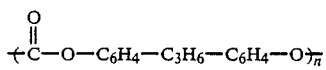

$$+C-O-C_6H_4-C_3H_6-C_6H_4-O+_{\overline{n}}$$

wherein n is a positive integer greater than one so as to yield a solid thermoplastic resin, see for example, Text Book of Polymer Science, 2nd Edition, Fred W. Billmeyer, Jr., 1971, Wiley-Interscience, New York, N.Y., the disclosure of which is incorporated herein by reference. Suitable commercially available polycarbonates are the LEXAN ® polycarbonates from General Electric Company.

The preferred thermoplastic blends of polyphenylene oxide and polystyrene are blends of poly 2,6-dimethyl-1,4-phenylene oxide and a high impact polystyrene.

The blend can be in a 20 to 80 weight percent ratio of either component. The term "high impact polystyrene" as used herein is intended to be generic to both the high impact polystyrene and the high impact copolymers derived from the isomeric methyl ethenyl benzenes mixtures and rubbery backbone polymers disclosed in U.S. Pat. No. 4,284,733, the disclosure of which is in its entirety incorporated herein by reference.

The process will be illustrated by use of a polyetherimide resin. One skilled in the art will appreciate that it is equally applicable to the appropriate polycarbonates and polyphenylene oxide-polystyrene polymer blends.

In carrying out the present process, it is preferred to employ a polymer that is anhydrous so as not to introduce the likelihood of forming acidic components through the combination of $H_2O$ and the solvent blowing agent. Any such acid products would be corrosive to the equipment and possibly degradative to the polymer or its foam structure. Subjecting the Ultem ® 1000 particles, for example, to a temperature of approximately 300° F. for a period of about 4 hours will assure at least the substantial absence of $H_2O$ in the resin. Equivalent drying conditions can be employed for the other polymers.

In preparing the comparatively low density shaped foam articles of the present invention, the selected polyetherimide resin is first imbibed with the above-identified solvent member. This solvent, for example, methylene chloride, should be imbibed or absorbed or otherwise taken up by the resin particles at a temperature less than about 100° F., preferably room temperature, to an extent which will subsequently permit expansion of said particles on heating the same above 100° F. The polyetherimide particles contemplated have the ability to readily absorb the subject solvent under relatively mild conditions, such as exposing the particles at approximately room temperature at standard pressure over a time period of up to 48 hours. Full exposure of the surface of the particles during this process enhances the absorption of the solvent. Imbibition of the solvent under these mild conditions will yield a composition which is still free flowable. This composition can be packaged for transport to a remote site for further processing according to the present process. The particle size of the resin is not critical so long as the subdivided resin is conveniently imbibed with the selected solvent. Obviously if the particles are too large they cannot be easily thoroughly imbibed with the solvent except by the use of extraordinary conditions. Conversely, if the particles are too small, this will increase the danger of premature agglomeration of the particles. A convenient particle size for the resin pellets would be from about less than 1/32-⅛ inch, or larger, in diameter and in length.

Any convenient system can be employed which will permit the particles to be exposed to the selected solvent. Good control of the imbibing process can be had by uniformly exposing all surfaces of the particles to the solvent in vapor form for whatever time is necessary to yield a still free flowable particle which has been imbibed with sufficient solvent to subsequently yield a pre-expanded particle of the ultimately desired density. Particles which are imbibed to the maximum, yet are still free flowable, will produce foamed pre-expanded particles of extremely low density, for example, a low as less than 1 lb. per cubic foot. On the other hand, particles which have been imbibed with a significantly lesser amount will yield ultimately a pre-expanded particle with a density approaching that of approximately 20 lbs. per ft.³.

When imbibing the particles, they may be supported on a suitable size mesh screen and the solvent vapors passed through the layer of the particles at approximately room temperature until the degree of imbibition is reached. Alternatively, the particles may be slowly fed into a vessel equipped with one or more agitation means to permit thorough exposure of the particles to the vapor form of the solvent. By these techniques, the pellets can be easily impregnated with from about 5–15 parts, preferably 10 parts, of the selected solvent per 100 parts of the resin particles. The imbibed particles are now in condition to be pre-expanded so that ultimately they may be incorporated into a suitable mold for formation into a comparatively low density part.

These imbibed pellets are pre-expanded by placing the same into a system where the particles can be uniformly exposed to a heating system which will cause each particle to foam as the temperature of the particle and the imbibed solvent increases. While the particles will foam by the application of heat alone, it is preferred that the particles be exposed to a heated mixture of an inert gas and the selected solvent in vapor form. For example, a mixture of methylene chloride and carbon dioxide in a ratio of from about 30:70 to 70:30 by volume can be employed. Preferably, a 50/50 volume mixture is passed through the imbibed particles. The temperature of the system can range from about 325°–500° F. As the individual pellets increase in volume they will become entrained in the gas mixture and will pass from the heating system to a point of collection remote from the heating system. The degree of pre-expansion can be controlled by monitoring the residence time of the particles so that the density of the expanded particles can range from approximately 1 lb. per cubic foot to about 20 lbs/ft$^3$. This control will also largely dictate the final density of the finished foamed parts.

After the imbibed particles are pre-expanded to the required degree, they can be then put through a molding cycle. The molding cycle includes the filling of the mold, fusion of the individual pre-expanded particles one to the other, cooling the mold, and removing the molded part. Any convenient prior art molding system can be employed utilizing known techniques for enhancing heat transfer and means for facilitating the separation of the part from the mold. By way of example, Teflon coated aluminum molds can be employed for high heat transfer rate and ease of separation of the part from the mold.

As in the case of pre-expanding the particles, heat and positive pressure alone can be employed in effecting a suitably fused foam particle part. It is preferred, however, to employ heat and vaporized solvent, e.g. methylene chloride, to effect fusion of the particles. For better control, it is preferred to employ a gaseous mixture of the solvent and an inert gas, such as carbon dioxide, to fuse the particles. Following this type of particle heating and, while a positive pressure of anywhere from about 2–30 lbs per square inch is maintained, the part is cooled and subsequently ejected from the mold. During fusion of the particles the temperature can be maintained at from about 325°–500° F.

The following is an example of the formation of a comparatively low density polyetherimide foam part.

EXAMPLE 2

Polyetherimide resin pellets having a particle size of about 1/16–⅛ inch in diameter and length, (available as Ultem ® 1000 from General Electric Company, Plastics Operation, 1 Plastics Avenue, Pittsfield, MA), are impregnated with methylene chloride to an extent of 10 parts per 100 parts of resin. Referring to FIG. 1, this is accomplished by placing a 2 in layer of the resin pellets 10 on a supporting screen 12 and exposing the pellets to methylene chloride vapors 14 at approximately room temperature. After a period of 24 hours the particles are imbibed to the extent indicated above. The particles remain freely flowable and can be packaged at this point for shipment to a remote site for completion of the process.

Figure 2:
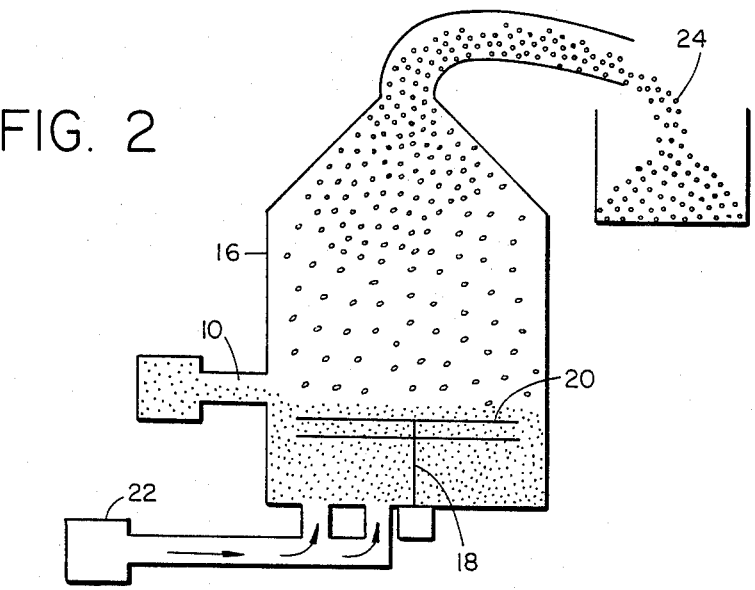
FIG. 2 is a side view of a schematic of a pre-expansion system.
Figure 3:
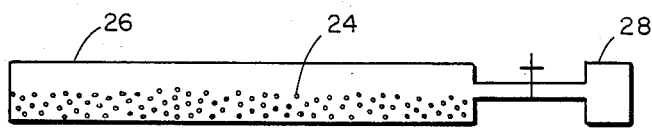
FIG. 3 is a side view of a schematic of a foam mold system.

Referring to FIG. 2, the imbibed particles are pre-expanded by feeding the imbibed pellets into an upright vessel 16 equipped with a motor-driven vertical shaft 18 having horizontal agitator bars attached thereto. As the imbibed particles are agitated, a 50/50 volume mixture of carbon dioxide and methylene chloride 22 is passed up and around each particle at a temperature of about 400° F. and at a rate sufficient to entrain the expanded particles. This will cause the volume of the individual pellets to increase and eventually become entrained in the rising gas mixture. The pre-expanded particles 24 will pass out of the vessel where they are collected for subsequent use in the molding operation. Conditions are selected so as to yield a density of the pre-expanded particles of about 10 lbs/ft.$^3$. Referring to FIG. 3, the pre-expanded particles 24 are then fed into a molding 26 having the dimensions of 12×12×0.5 inches. A 50/50 volume mixture of carbon dioxide and methylene chloride 28 at a temperature of 450° F. and a pressure of 2 psig is passed through the confined expanded pellets. On cooling the part is removed from the mold and will have a density of approximately 5 lbs. per ft.$^3$ with excellent beam strength.

This part will have all of the excellent flame resistant and low smoke characteristics of the virgin resin.

The subject process can be carried out with equivalent results by employing chloroform or trichloroethane or mixtures thereof with or without methylene chloride. The other disclosed polymers which are solvent absorbable to the extent of the limits stated herein can also be formed into molded parts having an excellent foam network.

What is claimed is:

1. A process for forming a shaped polymer foam structure comprising:
    (a) imbibing particles of a member selected from the group consisting of a polyetherimide, a polycarbonate and a polymer blend of polyphenylene oxide and polystyrene, with a solvent member selected from the group consisting of methylene chloride, chloroform, 1,1,2-trichloethane and mixtures thereof,
    (b) heating the imbibed particles to a temperature sufficient to cause expansion of said particles to a density significantly less than that of the imbibed particles; and
    (c) filling a mold with the expanded particles and subjecting the particles to sufficient heat to fuse the particles together on cooling to form a shaped coherent foam structure.

2. The process of claim 1 wherein the polymer is a polyetherimide of the following chemical structure:

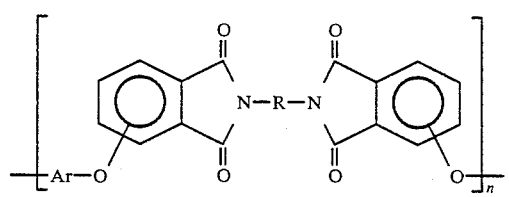

wherein n is a positive number, Ar is divalent radical containing from 6–20 carbon atoms, R is a bivalent radical selected from the group consisting of aliphatic, cycloaliphatic, aromatic and araliphatic groups.

3. The process of claim 2 wherein the particles are subjected to a pressure of from about 2-30 p.s.i. during the molding thereof.

4. The process of claim 3 wherein the imbibed particles of step (a) are at least substantially free flowable and at least not substantially expanded.

5. The process of claim 4 wherein said solvent member is present in up to 30 parts per 100 party by weight of resin.

6. The process of claim 5 wherein said solvent member is present in from 0.5 to 20 parts per 100 parts by weight of resin.

7. The process of claim 4 wherein said imbibed particles are expanded in a heated gas stream so as to entrain the same and subsequently collecting the expanded particles.

8. The process of claim 7 wherein the temperature of said heated gas stream ranges from that temperature sufficient to just cause some sensible particle expansion up to the highest processing temperature possible without causing particle agglomeration.

9. The process of claim 8 wherein said temperature range is from about 325°-500° F.

10. The process of claim 7 wherein said heated gas is a mixture of said solvent member and an inert gas.

11. The process of claim 10 wherein said mixture is carbon dioxide and methylene chloride.

12. The process of claim 1 wherein the density of the molded article is from about 1-20 lbs/ft$^3$.

13. The process of claim 12 wherein said density is from about 1-6 lbs./ft$^3$.

14. The process of claim 3 wherein the mold-filled particles are subjected to a temperature of from about 350°-500° F.

15. The process of claim 14 wherein said temperature is provided by hot gas contacting said particles.

16. The process of claim 15 wherein said hot gas includes said solvent member in gaseous-form.

17. The process of claim 16 wherein said hot gas includes an inert gas.

18. A process for forming an shaped polyetherimide foam structure comprising:
(a) imbibing particles of a polyetherimide with sufficient methylene chloride at a temperature less than @100° F. to subsequently permit expansion of said particles on heating the same above 100° F.;
(b) heating the imbibed particles to a temperature ranging from that temperature sufficient to cause some sensible particle expansion up to the highest processing temperature possible without causing particle agglomeration and;
(c) filling a mold with the expanded particles and subjecting the particles, under a positive pressure, to a heating system comprising a solvent member selected from the group consisting of methylene chloride, chloroform, 1,1,2-trichlorocthane and mixtures thereof at a temperature sufficient to fuse the particles together on cooling to form a comparatively low density shaped coherent foam structure.

19. The method of claim 18 wherein said polyetherimide is a polymer of the following chemical structure:

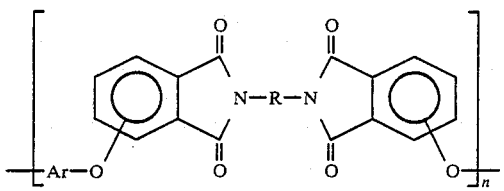

wherein n is a positive integer, Ar is a divalent radical containing from 6-20 carbon atoms, R is a bivalent radical selected from the group consisting of aliphatic, cycloaliphatic, aromatic and araliphatic groups.

20. The method of claim 19 wherein the precursor of Ar is Bisphenol A and R is phenylene.

21. The method of claim 20 wherein said solvent member is methylene chloride.

22. A shaped polyetherimide foam structure made by the process of claim 1.

* * * * *